Figure 1:
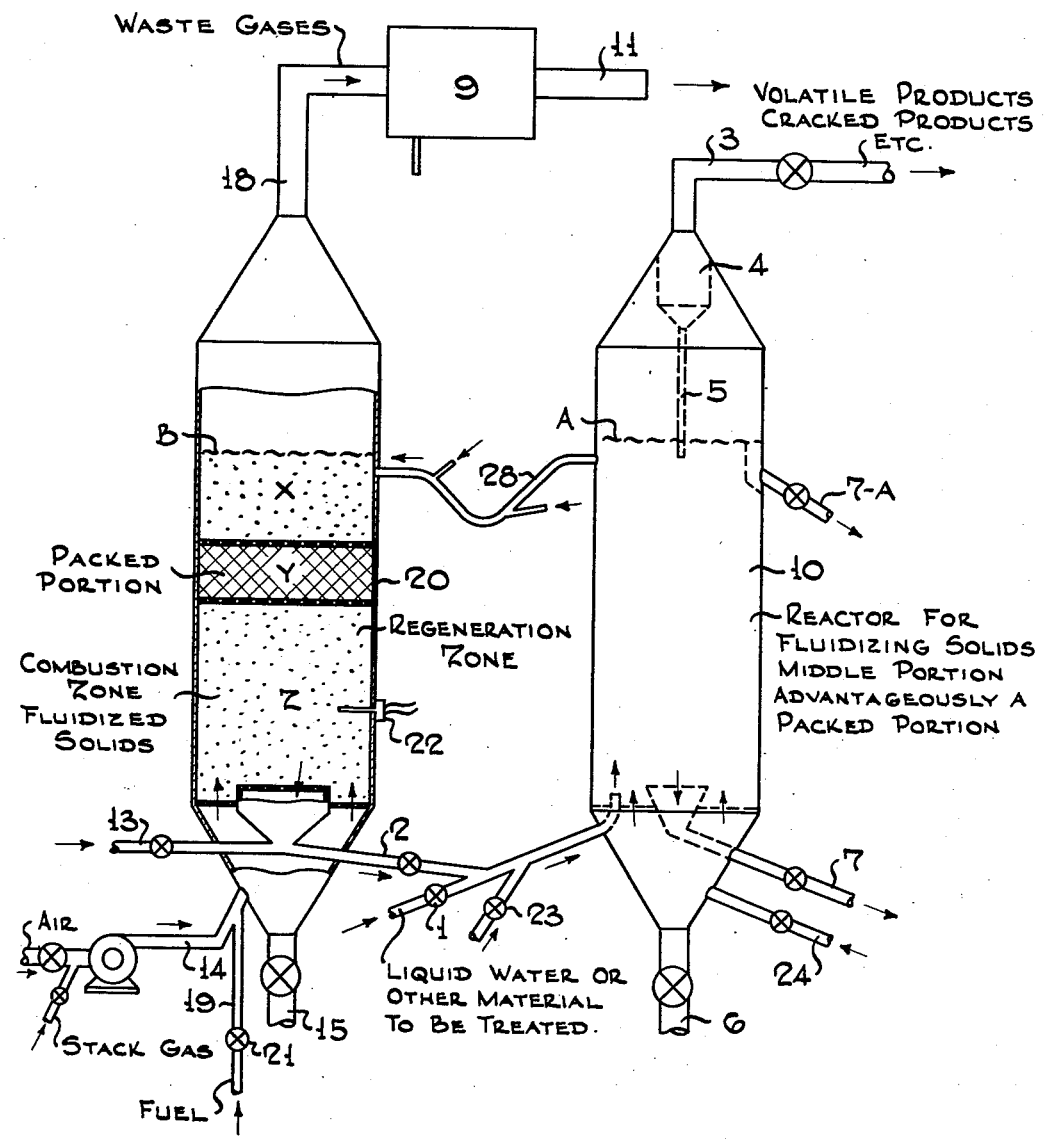

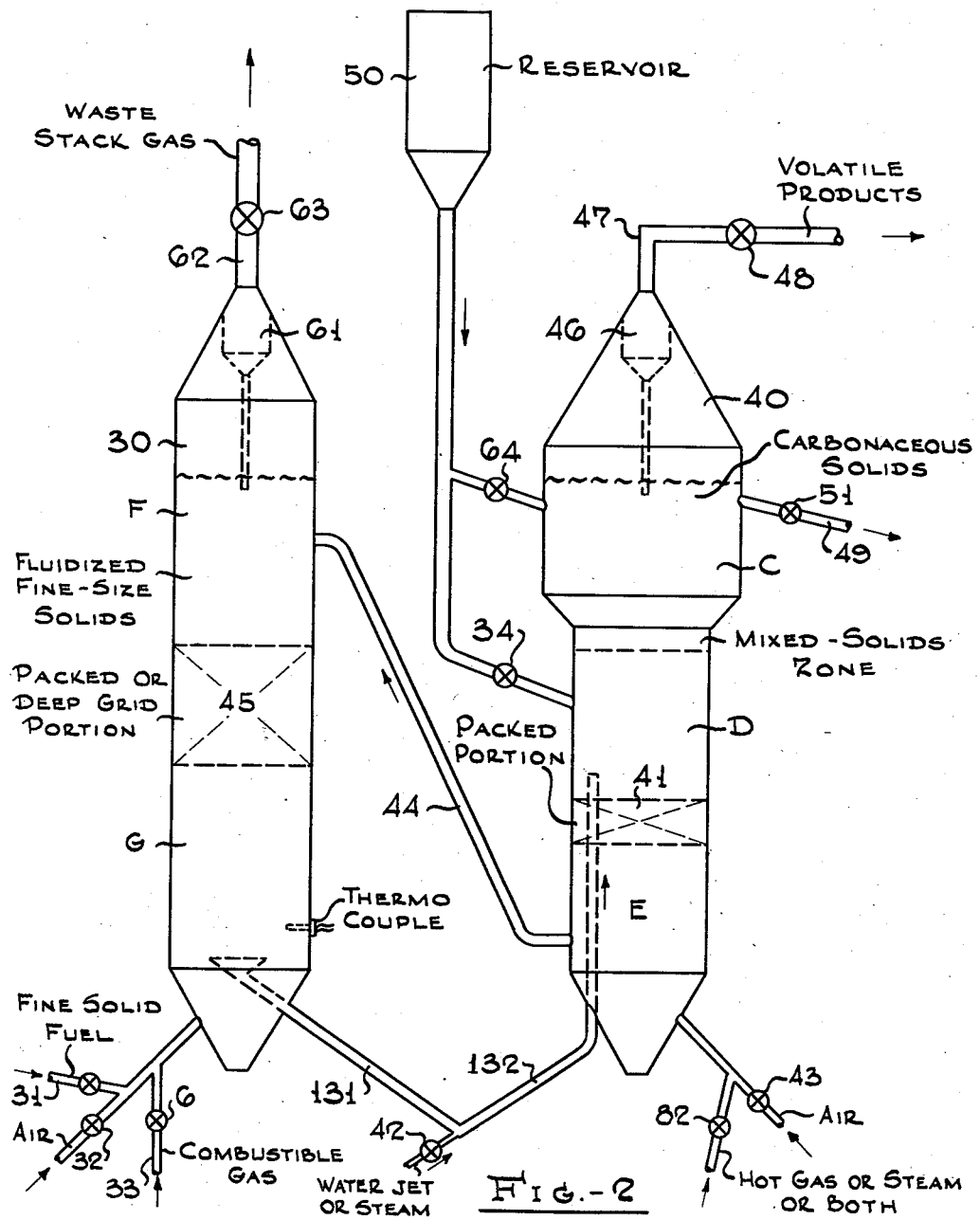

Patented June 19, 1951

2,557,680

UNITED STATES PATENT OFFICE 2,557,680

FLUIDIZED PROCESS FOR THE CARBONIZATION OF CARBONACEOUS SOLIDS

William W. Odell, Washington, D. C., assignor to Standard Oil Development Company, a corporation of Delaware Application February 15, 1947, Serial No. 728,794

5 Claims. (Cl. 202—14)

This invention is concerned with reacting carbonaceous materials, particularly solid carbonaceous materials, by contact with fluidized hot solids and for the production of steam from water by contacting it with hot solids. In accordance with my invention the solids are heated while passing the same in a stream continuously down through a packed column in contact with a rising stream of hot gases which are products of combustion. The heated solids are removed and circulated along with materials to be cracked, volatilized or otherwise heat-treated into a reactor wherein the heated solids are retained in a fluidized state. Vaporous products are removed from the reactor and separated from the solids after the solids have given up some sensible heat to said material. The solids are then recycled to said column.

This system offers economy of applying heat and accurate control of temperature in the reactor. When used for steam generation or where products should go out at a high temperature, the solids supplied to reactor can be fed at the top and the reactor may be a packed column. Further, the feed of material to reactor can be at the bottom when the reactor is packed or at a higher level, and the solids may be supplied at top and removed from bottom or supplied at the bottom and removed from top or bottom.

My process affords means of carbonizing heavy residues, cracking oils, making cheap steam for processing for water gas generation, producer gas production and carbonization of carbonizable matter such as shale, coal and lignite. My invention is broadly directed to systems in which hot, finely divided solids are contacted with volatilizable matter in a reaction zone for the purpose of vaporizing and/or cracking in combination with a circulating system of a packed column heater.

My invention is specifically concerned with a treating system comprising a reaction zone and a regeneration zone in which fluidized solids are circulated between the reaction zone and the regeneration zone. In accordance with my invention I contact or treat gases, liquids or solids with fluidized hot solids in a fine state of subdivision. The fluidized solids are withdrawn from the reaction zone and passed to a regeneration zone. In the regeneration zone the fluidized solids are regenerated by contacting the same preferably with an oxygen-containing gas. In accordance with a specific adaptation of my process the fluidized solids being regenerated are contacted in the lower area of the regeneration zone with an oxygen-containing gas. The gases comprising combustion gases pass upwardly through a packed area in the regeneration zone and then pass through a zone free of packing and contact incoming fluidized solids from the reaction zone. By operating in this manner, the heat contained in the combustion gases is employed to heat the fluidized solids introduced into the regeneration zone from the reaction zone, while these fluidized solids are maintained for a sufficient residence time in the area in the regeneration zone above the packed section. The fluidized solids pass continuously downwardly in the heating zone from the upper to a lower zone through a packed intermediate zone. The heated solids are then substantially continuously removed from the lower zone and handled as described.

The process of my invention may be readily understood by reference to the drawing in which Figure 1 is a semi-diagrammatic illustration of one embodiment of the invention; and Figure 2 is a similar illustration of another embodiment of the invention involving a different mode of solids circulation.

Figure 1 illustrates an embodiment of my invention wherein heated fluidized solids are removed from a lower area of a heater or regeneration zone, combined with feed material and introduced into the lower area of a reaction zone. The products of the reaction are withdrawn overhead from the reaction zone while the fluidized solids are withdrawn from the top of the reaction zone and passed into an upper area in a regeneration zone. These fluidized solids, as hereinbefore described, pass downwardly through the packed intermediate area of the regeneration or heating zone. Figure 2 illustrates an embodiment of my invention wherein feed materials are introduced into an intermediate area in the reaction zone, and wherein the heated fluidized solids are introduced through a lower area and withdrawn from the lower area of the reaction zone. These fluidized solids are recycled through a heater zone in a manner as hereinbefore described.

Referring specifically to Figure 1, the material to be treated is introduced into reaction zone 10 by means of feed line 1. The feed material together with fluidized solids which are introduced into line 1 by means of line 2 flow upwardly through zone 10 under conditions to maintain a fluidized ebullient bed within zone 10, the upper level of which is at point A. The gasiform products are withdrawn overhead from zone 10 by means of line 3 and handled in any manner desirable. The products pass through cyclone or equivalent separation means 4 wherein entrained solids are removed from the gases. Solid particles removed in cyclone separator 4 are returned to the fluidized bed in zone 10 by means of line 5. Although fluidized solids may be withdrawn from zone 10 by means of lines 6 and 7, I prefer to handle the fluidized solids as hereinafter described.

The fluidized solids, as for example solids containing carbon, are removed from zone 10 by means of line 28 and introduced into the upper area X of regeneration zone 20. These fluidized solids are maintained in a fluidized ebullient state in zone 20, the upper level of which is at point B. During a predetermined residence time the fluidized solids in area X are heated by contact with hot upflowing combustion gases which gases are removed from zone 20 by means of line 18, passed through a waste heat boiler 9 and withdrawn from the system by means of line 11.

After the fluidized solids have reached a predetermined temperature as determined by the residence time of the solids in area X the solids flow downwardly between the interstices of solid nonfluidized packing material maintained in an intermediate area Y of regeneration zone 20.

The fluidized solids then enter combustion area Z of zone 20 wherein the solids are treated with oxygen-containing gases under combustion conditions. The treated solids are withdrawn from area Z of zone 20 by means of line 2 and handled as hereinbefore described. Fresh fluidized solids or catalyst may be introduced into the system by means of line 13. Air or oxygen-containing gas or hot stack gas may be introduced into zone 20 by means of line 14. If desired a portion of the fluidized solids may be withdrawn from zone 20 by means of line or conduit 15 and handled in any manner desirable.

Referring specifically to Figure 2 which illustrates another embodiment of my invention, it it possible to circulate as heat exchange medium, hot solids which are the means of heating other hot solids. For example, sand may be fluidized and heated in heater 30 by burning fuel with air supplied to zone 30 by means of lines 31 and 32 respectively. The fuel may comprise fine solid fuel introduced by means of line 31 or a combustible gas which may be introduced by means of line 33. The hot sand is continually withdrawn from zone 30 by means of line 131 and passed through conduit 132 into zone D of reactor 40. The material to be treated, which for the purpose of illustration is assumed to be finely divided coal, is conducted from reservoir 50 and passed through valve 34 into zone D of reactor 40. The hot sand and coal are fluidized in admixture in D, the sand tending to pass downwardly through a packed portion 41 into zone E, and the coal becoming heated by virtue of heat supply, carbonizes and passes upwardly into zone C of reactor 40. The fluidizing fluid employed in reactor 40 may be hot gas or steam, or both, and some air may be employed when desired for the purpose of adding additional amounts of heat to the fluidized mass. The hot gases and/or steam are admitted through valve 82 while the air is admitted through valve 43. The sand introduced into reactor 40 by means of conduit 132 cools as it passes downwardly through zone E and is removed therefrom through conduit 44. This relatively cool sand is returned to zone F in heater 30. The sand passes downwardly through zones F and G in zone 30 and becomes reheated and recirculated to zone 40 as described. Heater 30 contains an intermediate packed zone 45. The volatile products from the carbonization of the coal are removed through cyclone separator or equivalent means 46 and removed from the system through line 47, controlled by valve 48. The carbonized solids are removed from the upper area of the fluidized bed, the upper level of which is at L, and removed from the system by means of line 49, controlled by means of valve 51. A substantially constant level of carbonaceous residue is maintained in reactor 40 by synchronizing the rate of feed of the coal through valve 34 and the rate of discharge of coke through line 49. When this operation is promoted at high velocities, it is found that a small amount of carbonaceous matter adheres to the sand particles circulated from reactor 40 through line 44. This carbonaceous matter is sufficient in most cases to provide the necessary heat by combustion in heater 30. Under these conditions, no separate fuel is supplied to the base of heater 30. Because the sand normally requires a higher velocity of flow of the fluidizing stream passing through it than is required for similarly fluidizing finely divided coke, it is desirable that the upper portion of reactor 40 be of greater diameter than the lower portion in order to avoid carrying over of an excessive amount of dust.

Combustion gases are removed through cyclone separator or equivalent means 61 and withdrawn from zone 30 by means of line 62, controlled by means of valve 63. Coal may be introduced at a plurality of points into reactor 40 by means of lines 64 and 34.

My invention generally comprises treating fluidized solids in a treating zone and maintaining in said treating zone an intermediate area which contains solid nonfluidized packing. The fluidized solids to be treated are preheated or brought up to a desired temperature in an area above the packed area of said treating zone. These solids to be treated are brought up to the temperature desired by contact with the upflowing hot gases coming from below the packed area in the treating zone. After the fluidized solids have reached the predetermined temperature, these fluidized solids flow downwardly between the interstices of the packed area and into the combustion area in the treating zone. A preferred adaptation of my invention is where the treating zone referred to heretofore, comprises a regeneration zone used in conjunction with a reaction zone and wherein fluidized solids are circulated between said reaction zone and said regeneration zone.

The packed zone is filled with packing or dispersing elements adequately spaced to provide a labyrinth of discontinued passageways in which the gases are in contact with the finely divided solids which are flowing downwardly within said passageways. These dispersing or packing elements prevent the overall swirling or rapid circulation of the solids and further function to maintain a preheating area above the packed area.

The size and character of the packing, as well as its employment in the fluid zone, may vary appreciably. For example, the packing or dispersing elements may be dumped into the reaction or fluid zone in random fashion, or it may be made to assume predetermined geometric patterns. In general, the packing may vary from a minimum dimension of ¼ inch to a maximum dimension of 12 inches or more. Packing elements of the saddle type having a maximum dimension of 1 inch to 2 inches (for example Berl Saddles), are particularly suitable for most reactors.

The relative thickness of the packed portion Y in zone 20 relative to the thickness of portions X and Z may be substantially as shown in Figure 1 or it may be thicker than either portion X or portion Z. As finely divided solids are passed downwardly through X, Y, and Z, as the hot gases pass upwardly through Z, Y, and X, there results a temperature difference in the bed of fluidized solids, the temperature being higher in portion Z than in portion X. The packed portion Y not only makes it possible to obtain a greater efficiency in the utilization of heat but it makes possible the effective use of counterflow process, that is, it makes it possible for the solids admitted from 28 into X to pass downwardly through X, Y, and Z at a controlled rate. This condition does not obtain when the whole bed is in a fluidized state without the intermediate packed portion. In other words, without the packed portion the particles in ebullient motion are not only all at the same temperature but the mixing due to ebullient motion is violent and the particles admitted at the top may be at the bottom in the next instant. When the packed portion Y has considerable depth or thickness, it also functions as a heat transfer agency. In other words the hot gases passing upwardly in 20 supply heat to the heat surface in the packed portion Y and the heat thus stored is transmitted to the downwardly flowing fluidized particles passing from X to Z. Thus there is a double purpose for the use of a packed portion in 20. When this packed portion Y is thick there is a heat gradient from bottom to top as the finely divided fluidized solids are passed downwardly through the bed in 20; the highest temperature being at the bottom portion of Y and the lowest temperature at the top thereof. It is understood that a similar packed portion may be employed in the reaction zone 10, and in many cases its use in 10 is indicated.

My invention may be further understood by the following examples illustrating adaptations of the same. For the purpose of illustration, Example 1 describes a process for the carbonization of finely divided coal.

*Example 1*

A bed of finely divided coke is fluidized in portion Z of 20 by introducing air at a linear velocity of approximately 1.5 to 2.5 feet per second, through supply conduit 14 passing the air stream out through 18, 9 and 11. The coke is ignited and the air blasting continued for the purpose of heating the coke particles in 20. The bed is built up by supplying an additional amount of coke through valve 13 until the bed level in 20 is about as shown at B. The velocity of the gases flowing through the bed is maintained sufficient to keep the coke in a substantially fluidized state in the areas X, Y, and Z. This velocity for coke particles in the range 20 to 100 mesh is approximately 2.0 to 0.6 feet per second. As soon as the temperature indicated by use of thermocouple 22 in area Z is approximately 1800° F. in this example, the circulation of solids (coke) from 20 through 2 to reaction zone 10 is promoted. Meanwhile finely divided coal is introduced through valve 1 into 10 along with the hot coke and a bed of fluidized solids is built up to a level A in 10. This bed comprises largely particles of finely divided coke along with particles of finely divided coal in various stages of carbonization. The relative amounts of hot coke introduced through 2 and the finely divided coal introduced through 1 are proportioned so that the coal in process reaches the desired maximum temperature in 10. Normally it is desirable to employ about three to six volumes of coke circulated through 2 to one volume of coal circulated through 1. The temperature of the hot coke in area Z may be at any chosen level above the ignition temperature up to or approaching that of the ash softening point of the coke; it is selected with reference to the desired degree of carbonization of the coal admitted through 1 and will vary for a given coal according to the moisture content of the coal as introduced through 1. The volatile matter, gases and vapors evolved in the carbonization process in 10, are passed out through 4 and 3, and are recovered whereas the carbonized residue is withdrawn through 7 or through 7—A as desired. The particles of carbonized coal are removed from 10 through 8 preferably continuously and conducted back to 20 in an upper area X thereof to be reheated in 20 and recirculated down through Y and Z and back to zone 10 as a heat transfer medium for the carbonization of additional amounts of coal. I have found it possible to so treat a coal that the volatile content of the coke residue can be controlled at will from a very low volatile content to substantially that of the coal initially introduced. This is done by adjusting the amount of combustion promoted in area Z of 20 and by regulating the amount of recirculation of the hot coke particles through 2 and the relative amount of coal fed through 1. When employing relatively low temperatures in 20 or when circulating a relatively small amount of hot coke particles through 2, it is sometimes necessary to circulate some stack gases or other inert fluid along with the air supplied through 14 to zone 20 in order that the temperature in area Z be not too high and in order simultaneously to maintain the coke particles in a fluidized state in 20. In treating coal as described in the foregoing it is possible to recover maximum yields of tar and gas with a minimum amount of inert dilution.

The following example describes my invention in connection with the production of heated process steam suitable for gas making or other purposes.

*Example 2*

Sand is fluidized in 20 in a similar manner as described for coke in Example 1 and the fluidized bed is blasted with air and fuel, which fuel is admitted through 21. The fuel is burned in area Z at a controlled rate, the heated sand is withdrawn preferably continuously through 2 and conducted into reaction chamber 10 along with water vapor introduced through 1 in controlled relative amounts. The water vapor is heated by contact with the fluidized hot sand and rises through the fluidized bed in 10 and passes out through 4 and 3 at a temperature which is dependent chiefly on the relative amounts of sand and water vapor circulated into 10 and on the temperature of the hot sand circulated through 2. In this manner it is possible to superheat steam to temperatures which are not normally feasible employing metal tubes or similar superheaters. The sand supplied to 10 is cooled in passing through 10 and is returned through 28 to 20 and reheated and recirculated as described. It will be understood that water instead of water vapor can be introduced through 1 and in this case the hot sand will supply the heat necessary for vaporization of the water as well as for the superheating of the resultant steam.

Obviously other materials can be heat treated with or without combustion in direct contact therewith employing heated solids in circulation as a heat transfer medium, which medium contacts the solids to be treated. In the foregoing examples coal was employed having a size range approximating 60 mesh to 200 mesh but coarse or finer sizes can be used when desired. It is only necessary to maintain a velocity of flow of the fluidizing agent sufficiently high to maintain the particles in a fluidized state. These velocities are known for various sizes of materials but for the purpose of example it can be said that the larger the size of coal fluidized the greater must be the velocity of flow of the fluidized medium.

It will, of course, be obvious that the operations described can be conducted at high pressure or at subatmospheric pressures, but in order to avoid the use of compressors or vacuum equipment it is usually preferable to conduct the operations under pressure above atmospheric as required for the suitable fluidization of the confined solids.

The spacing or packing elements should be shaped and arranged within the reactor so as to avoid extended horizontal surfaces on which the solid particles undergoing treatment can settle and collect.

The process of my invention is not to be limited by any theory as to mode of operation, but only in and by the following claims in which it is desired to claim all novelty insofar as the prior art permits.

I claim:

1. In the process for heat-treating carbonaceous solids by intimately contacting a dense turbulent bed of subdivided carbonaceous solids fluidized by an upwardly flowing gas stream in a reactor with a hot subdivided solid heat carrier having a lower gas entrainability than said carbonaceous solids, which carbonaceous solids are also highly heated in a separate heater in the form of a fluidized solids mass, separating heat treated carbonaceous solids from cooled heat carrier by virtue of the different fluidizable characteristics between the carbonaceous solids and the heat carrier and returning cooled heat carrier to said heater, the improvement which comprises feeding said carrier to the upper portion of said heater, feeding fuel and a combustion-supporting gas to a lower portion of said heater, conducting a heat-generating combustion in said lower portion, passing hot combustion gases from said lower portion to said upper portion, adjusting the superficial velocity of said combustion gases so as to percolate said carrier from said upper portion downwardly to said lower portion countercurrently to upflowing combustion gases through a multitude of narrow passageways irregular with respect to shape, diameter and direction extending over a substantial height and occupying the entire cross-sectional area of an intermediate portion of said heater, further heating said carrier in said lower portion by said combustion, withdrawing hot heat carrier from said lower portion, introducing hot heat carrier so withdrawn and fresh carbonaceous solids into an intermediate area of said reactor, adjusting the superficial gas velocity in said reactor so as to cause said heat carrier to flow downwardly in said reactor, withdrawing cooled heat carrier from a lower portion of said reactor and returning said cooled heat carrier solids to an upper portion of said heater, passing carbonaceous solids upwardly through said reactor as a result of said adjusted gas velocity to an upper expanded portion of said reactor, withdrawing volatile heat-treated products overhead from said reactor, and withdrawing heat-treated carbonaceous solids from the said upper expanded portion of said fluidized bed.

2. Process as defined by claim 1 wherein said heat carrier comprises sand.

3. Process as defined by claim 1 wherein said heat carrier comprises noncarbonaceous solids having a small percentage of carbonaceous matter on their surfaces.

4. Process as defined by claim 1 wherein said heat carrier is heated in said heater by oxidizing carbonaceous matter on the surfaces of said heat-carrier.

5. Process as defined by claim 1 wherein said heat carrier is partially heated in said heater by oxidizing carbonaceous matter on the surfaces of said heat carrier, and wherein the remaining heat required for said heat-conducting solids is supplied by oxidizing a combustible fuel in the lower area of said heater.

WILLIAM W. ODELL.

REFERENCES CITED

The following references are of record in the file of this patent:

UNITED STATES PATENTS

| Number | Name | Date |
|---|---|---|
| 1,983,943 | Odell | Dec. 11, 1934 |
| 1,984,380 | Odell | Dec. 18, 1934 |
| 2,414,586 | Egloff | Jan. 21, 1947 |
| 2,418,679 | Utterback | Apr. 8, 1947 |

FOREIGN PATENTS

| Number | Country | Date |
|---|---|---|
| 119,626 | Australia | Mar. 15, 1945 |
| 189,542 | Great Britain | Dec. 1, 1922 |
| 574,892 | Great Britain | Jan. 24, 1946 |